(12) United States Patent
Althaus et al.

(10) Patent No.: US 6,461,799 B2
(45) Date of Patent: Oct. 8, 2002

(54) METHOD FOR PRODUCING PLANO-CONVEX CONVERGENCE LENSES

(75) Inventors: Hans-Ludwig Althaus, Lappersdorf; Gerhard Kuhn, Köfering, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/863,954

(22) Filed: May 23, 2001

Prior Publication Data
US 2001/0026658 A1 Oct. 4, 2001

Related U.S. Application Data

(62) Division of application No. 09/533,562, filed on Mar. 22, 2000, which is a continuation of application No. PCT/DE98/02767, filed on Sep. 17, 1998.

(30) Foreign Application Priority Data

Sep. 22, 1997 (DE) .......................................... 197 41 702

(51) Int. Cl.[7] .................................................. G02B 3/00
(52) U.S. Cl. .............................. 430/321; 216/2; 216/26
(58) Field of Search .............................. 430/321; 216/2, 216/26

(56) References Cited

U.S. PATENT DOCUMENTS

| | | | |
|---|---|---|---|
| 4,752,109 A | 6/1988 | Gordon et al. | |
| 4,753,521 A | 6/1988 | Deserno | |
| 4,842,360 A | 6/1989 | Caro et al. | |
| 4,977,407 A | 12/1990 | Crane | |
| 5,316,527 A | 5/1994 | Wakabayashi et al. | |
| 5,633,527 A | 5/1997 | Lear | |
| 5,853,960 A | * 12/1998 | Tran et al. ................... | 430/321 |
| 6,220,059 B1 | 4/2001 | Klein et al. | |

FOREIGN PATENT DOCUMENTS

| | | |
|---|---|---|
| DE | 36 34 187 A1 | 4/1988 |
| DE | 41 33 220 C2 | 4/1993 |
| DE | 43 07 986 A1 | 9/1994 |
| EP | 0 425 858 A2 | 5/1991 |

OTHER PUBLICATIONS

Patent Abstracts of Japan No. 02–127605 (Mitsuru), dated May 16, 1990.

Patent Abstracts of Japan N. 61–248490 (Hiroyoshi), dated Nov. 5, 1986.

* cited by examiner

*Primary Examiner*—John A. McPherson
(74) *Attorney, Agent, or Firm*—Laurence A. Greenberg; Werner H. Stemer; Gregory L. Mayback

(57) ABSTRACT

An optical system for injecting laser radiation emitted from a semiconductor laser into an optical conductor, in which a convergent lens is configured between the semiconductor laser and the optical conductor. A diaphragm for masking out a portion of the laser radiation emitted from the semiconductor laser is applied to the convergent lens.

2 Claims, 3 Drawing Sheets

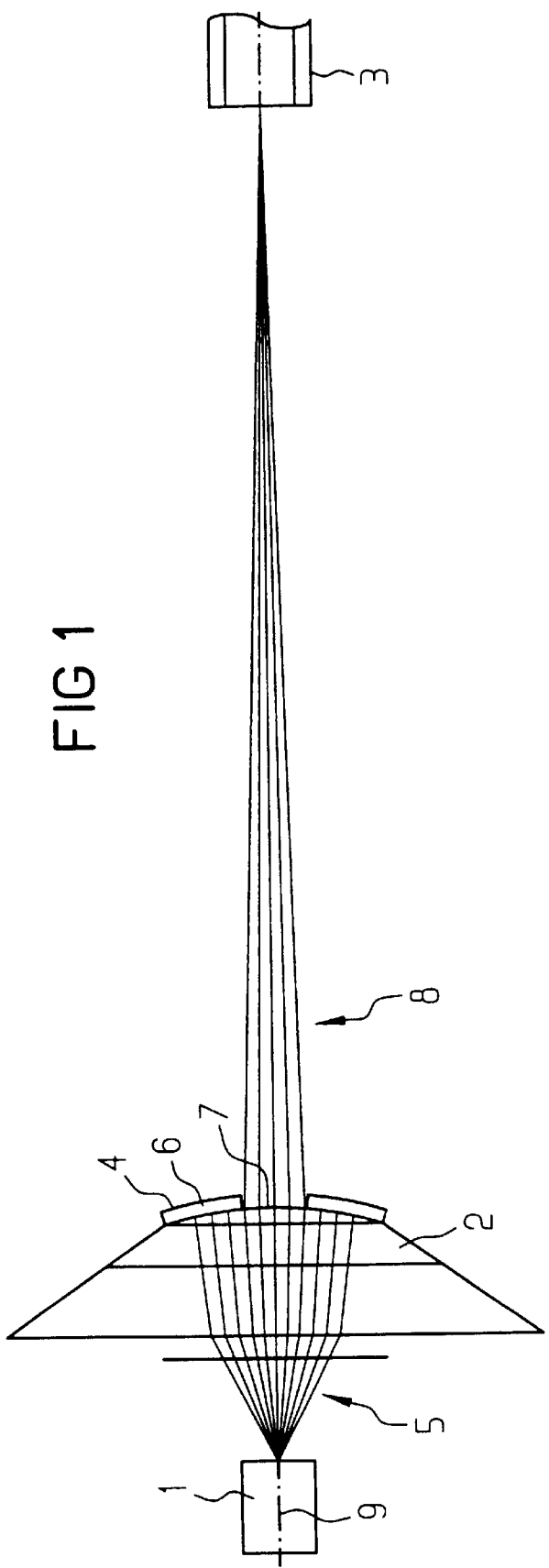

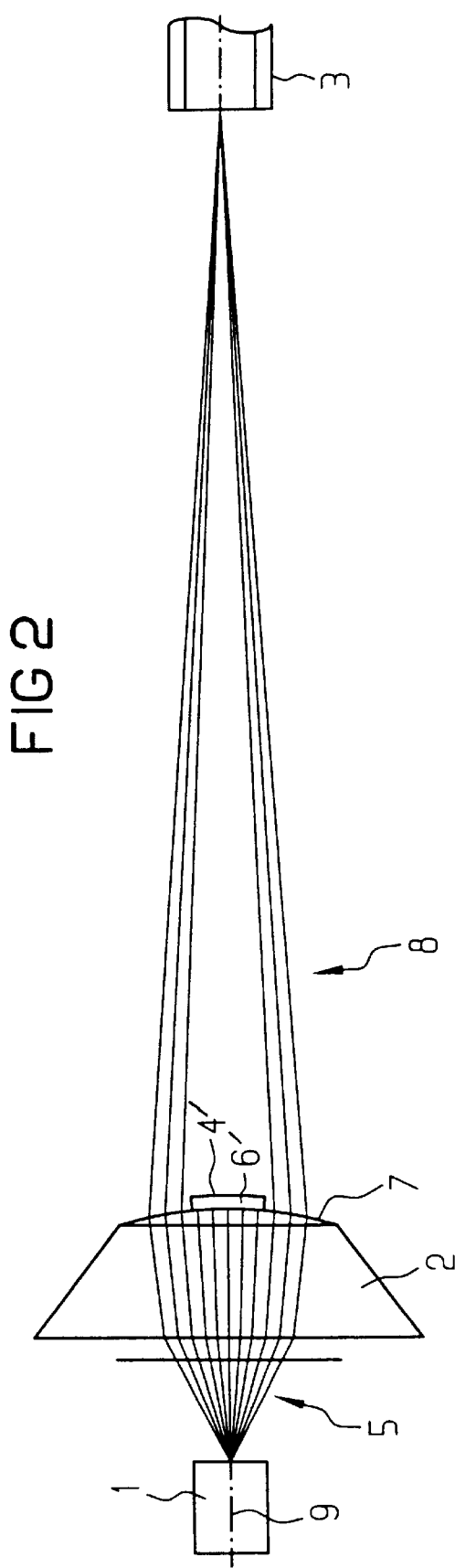

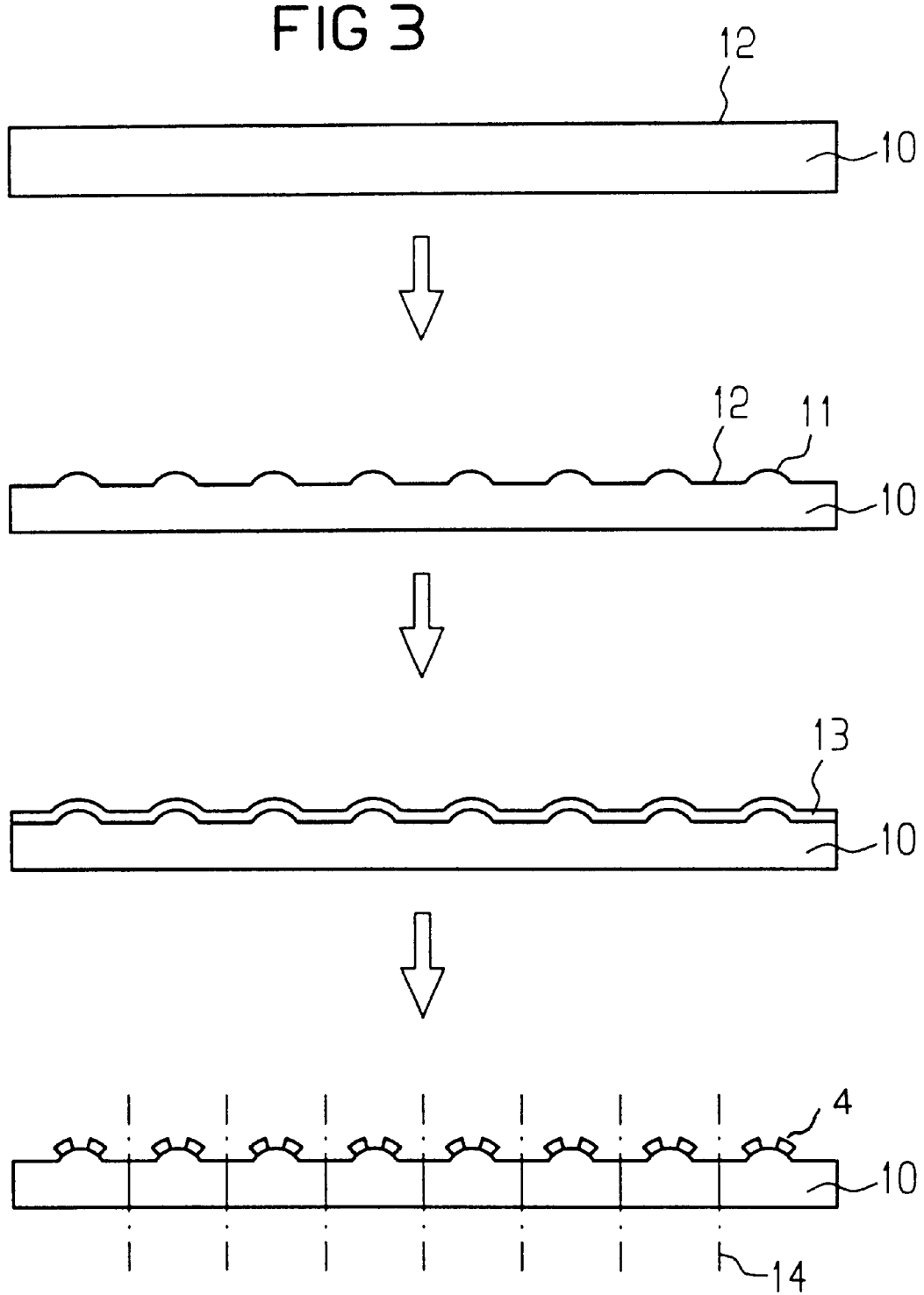

METHOD FOR PRODUCING PLANO-CONVEX CONVERGENCE LENSES

CROSS-REFERENCE TO RELATED APPLICATION

This is a division of U.S. application Ser. No. 09/533,562, filed Mar. 22, 2000, which was a continuation of copending International application No. PCT/DE98/02767, filed Sep. 17, 1998, which designated the United States.

BACKGROUND OF THE INVENTION

FIELD OF THE INVENTION

The invention relates to a method for producing plano-convex convergent lenses which can be used in an optical system that includes a convergent lens for injecting laser radiation emitted from a semiconductor laser into an optical device.

In optical information transmission, radiation from semiconductor laser emitters, which generally emit widely divergent beams, has to be injected into optical conductors, such as optical fibers. Furthermore, the power to be injected has to be matched to the requirements of various transmissions systems and standards.

In known laser modules involving information transmission technology (see, for example, DE 41 33 220), the laser emitter is followed by a spherical, biconvex or plano-convex lens that converts the highly divergent beam into a convergent beam. In order to inject the desired radiation power into the optical conductor, the optical conductor must be adjusted in all three spatial directions. These systems thus involve a very high level of assembly effort, in particular because of the complex adjustment in the z-direction. Furthermore, mechanical instabilities often occur in these systems.

A further disadvantage of the known optical systems of the type mentioned initially is that additional technical means have to be used to prevent the laser radiation that is not injected into the optical conductor from emerging from the corresponding component. European Patent Application EP 0 566 15 341 A1, which represents the closest prior art, describes a connector device for connecting a laser diode to an optical fiber. The connector device comprises a plano-convex lens configured in the beam path on the light inlet side, a diaphragm plate configured behind the lens, and an optical connecting element provided on the light outlet side. The lens, diaphragm plate, and optical connecting element are located (for reasons of mutual alignment) in a common socket, and their touching surfaces are bonded using a transparent adhesive.

SUMMARY OF THE INVENTION

It is accordingly an object of the invention to provide a method for producing plano-convex convergence lenses which can be used in an optical system that includes a convergent lens for injecting laser radiation emitted from a semiconductor laser into an optical device and which overcome the hereinafore-mentioned disadvantages of the heretofore-known methods and devices of this general type in such a way that the optical device can be easily adjusted.

In particular, it is an object to provide an optical system by means of which the radiation power to be injected into the optical device (optical conductor) can be varied in a simple manner.

In particular, the convergent lens is provided with a structured coating in the form of a diaphragm (for example a perforated or zone diaphragm) for masking out a portion of the laser radiation emitted from the semiconductor laser emitter. This is achieved by configuring the convergent lens to pass only that portion of the laser beam emitted from the semiconductor laser emitter that is intended to be injected into the optical conductor.

Masking out the laser radiation with a high divergence angle advantageously improves the quality of the focusing of the convergent lens. A major advantage of the optical system according to the invention is, in particular, that the portion of the beam emitted from the semiconductor laser emitter which is in any case not injected into the optical conductor is masked out. In consequence, receptacle components advantageously achieve the same eye safety as pigtail components.

With the foregoing and other objects in view there is provided, in accordance with the invention, an optical system that includes a semiconductor laser for emitting laser radiation, an optical device, and a convergent lens. The convergent lens is configured between the semiconductor laser and the optical device for injecting the emitted laser radiation into the optical device. The convergent lens is provided with a coating structured to have the form of a diaphragm for masking out a portion of the emitted laser radiation.

In accordance with an added feature of the invention, there is provided a structured coating (diaphragm) which is preferably composed of metal, and which can be applied in a simple manner to the surface of the convergent lens, by means of vapor deposition. The convergent lens may be composed of glass, silicon or some other semiconductor material that passes the respective laser radiation wavelength. It is particularly preferred for the convergent lens to be a plano-convex lens, with the structured coating provided on the convex side.

In accordance with an additional feature of the invention, there is provided a structured coating that is preferably in the form of a perforated diaphragm and that masks out the portion of the laser radiation whose divergence angle is greater than the acceptance angle of the optical conductor. The radiation power injected into the optical conductor is varied by varying the divergence angle below the value of the acceptance angle, without having to change the geometrical configuration of the entire system that includes the semiconductor laser emitter, convergent lens, and optical device that can be an optical conductor.

In accordance with another feature of the invention, there is provided a structured coating that is preferably in the form of a zone diaphragm for masking out the high-intensity central beam. This reduces the injected power and increases the eye safety of receptacle versions.

In accordance with a further feature of the invention, the optical system may be employed in an advantageous manner for coupling the laser beam of the semiconductor laser emitter in a multi-mode fiber. Only the fundamental mode of the multi-mode fiber is stimulated by masking out the laser radiation with a high divergence angle. The transmission characteristics of a single mode fiber are thus simulated in the multi-mode fiber.

With the foregoing and other objects in view there is provided, in accordance with the invention, a method for producing a multiplicity of plano-convex focusing lenses. An Silicon wafer is first produced which is provided with a plurality of convex elevations on a first main surface, using photographic techniques and etching. A first metallic layer is applied which is by using photographic techniques and etching, structured such that, on the convex elevations, (ring-shaped) perforated diaphragms or disc-shaped zone diaphragms remain. Once its second main surface has been bonded onto an adhesive film, for example, the silicon wafer is then sliced through, for example, by sawing or cutting grinding, to form individual plano-convex convergent lenses with a perforated diaphragm or zone diaphragm.

The use of the optical system according to the invention is, of course, not limited for injecting laser radiation into an optical fiber. It can be used in any apparatus in which only a portion of an available laser beam is intended to be injected into an optical device.

Other features which are considered as characteristic for the invention are set forth in the appended claims.

Although the invention is illustrated and described herein as embodied in a method for producing plano-convex convergence lenses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 shows a schematic illustration of a section through a first exemplary embodiment and shows the beam path;

FIG. 2 shows a schematic illustration of a section through a second exemplary embodiment and shows the beam path; and FIG. 3 shows a schematic illustration of the method for producing a plurality of optical systems as per the exemplary embodiments.

DESCRIPTION OF THE PREFERRED EMBODIMENTS

Referring now to the figures of the drawing in detail and first, particularly, to FIG. 1 thereof, there is shown a convergent lens in the form of a spherical or aspherical silicon plano-convex lens 2 that is configured between a semiconductor laser emitter 1 and an optical conductor 3, in this case an optical fiber. The curved surface 7 of the plano-convex lens 2 is provided with a perforated diaphragm 4 thereon, which can include a metallic layer 6 or be a layer that is entirely composed of metal (for example Al). This perforated diaphragm 4 masks out an edge region of the highly divergent radiation or laser beam 5 emitted from the semiconductor laser emitter 1, allows only a center region of the laser beam 5 around its beam axis 9 to pass therethrough, and converts this into a convergent laser beam 8. Only this portion of the divergent laser beam 5 is injected into the optical conductor 3, specifically the optical fiber.

The perforated diaphragm 4 is dimensioned, in particular, such that the convergence angle (or the divergence angle once again after passing through the focus) of the radiation to be injected is equal to or less than the acceptance angle of the optical fiber. This means that the diaphragm 4 masks out the portion of the laser radiation or beam 5 that is in any case not injected into the optical fiber 3.

The optical system shown in FIG. 1 may be used for injecting laser radiation 5 into a multi-mode fiber that is provided as the optical conductor 3. Masking out the laser radiation having a high divergence angle then results in only the fundamental mode being stimulated. The transmission characteristics of a single-mode fiber are thus simulated in the multi-mode fiber.

The exemplary embodiment shown in FIG. 2 differs from that in FIG. 1 essentially in that a zone diaphragm 4', which is in the form of a disc and is a metallic layer 6' is provided instead of the perforated diaphragm 4 shown in FIG. 1. This zone diaphragm 4' masks out the high-intensity central beam of the laser beam 5 emitted from the semiconductor laser emitter 1.

A method for producing a plurality of plano-convex convergent lenses 2, made of silicon, in which a perforated diaphragm 4 is applied to the convex side 7, is shown schematically in FIG. 2. The method includes the following method steps:

a) producing a silicon semiconductor wafer 10;

b) producing a plurality of convex projections 11 on a first main surface 12 of the silicon wafer 10 by means of a photographic technique and etching;

c) applying a metal layer 13 to the entire first main surface 12;

d) structuring the metal layer 12 by means of a photographic technique and etching, in such a manner that a diaphragm 4 remains on each convex projection 11; and e) slicing through the silicon wafer 10 between the convex projections 11, along separation lines 14, to form individual plano-convex convergence lenses 2 with a diaphragm 4

A plurality of plano-convex convergent lenses 2 with zone diaphragms 4' can be produced, for example, using an analogous method.

We claim:

1. A method for producing plano-convex convergence lenses, which comprises:

providing a semiconductor wafer with a main surface;

producing a plurality of convex projections on the main surface of the semiconductor wafer;

applying a metal layer to the entire main surface of the semiconductor wafer;

providing a diaphragm on each one of the plurality of convex projections by structuring the metal layer; and forming a plurality of individual piano-convex convergence lenses with a diaphragm by slicing through the semiconductor wafer between each one of the plurality of convex projections.

2. The method according to claim 1, which comprises using a photographic technique and etching to perform the step of producing a plurality of convex projections and using a photographic technique and etching to perform the step of providing a diaphram.

* * * * *